Patented Oct. 6, 1953

2,654,724

UNITED STATES PATENT OFFICE 2,654,724

COPOLYMERS OF VINYLIDENE CYANIDE WITH ALKYL VINYL KETONES

Harry Gilbert, Cuyahoga Falls, and Floyd F. Miller, Wadsworth, Ohio, assignors to The B. F. Goodrich Company, New York, N. Y., a corporation of New York No Drawing. Application June 24, 1952, Serial No. 295,350

7 Claims. (Cl. 260—63)

This invention relates to novel copolymers of vinylidene cyanide with alkyl vinyl ketones and the preparation thereof, which copolymers are extremely useful resinous materials.

In U. S. Patents 2,476,270 and 2,502,412 to Alan E. Ardis, and 2,514,387 to Harry Gilbert, novel methods for preparing monomeric vinylidene cyanide are disclosed. U. S. Patent 2,589,294 to Richard F. Schmidt et al. discloses the preparation of useful homopolymers of vinylidene cyanide.

Monomeric vinylidene cyanide is a clear liquid at room temperature and a crystalline solid at 0° C. It melts in the range of 6.0° C. to 9.7° C., depending upon purity, with the purest samples melting at 9.0° C. to 9.7° C., and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When the monomer is allowed to stand at room temperature in admixture with 1,3-butadiene, it reacts therewith to give solid 4,4-dicyanocyclohexene.

It has now been discovered that monomeric vinylidene cyanide having the above physical and chemical characteristics will copolymerize with alkyl vinyl ketones to give new and highly useful copolymers.

The alkyl vinyl ketones which are polymerized with vinylidene cyanide in accordance with the present invention passes the structure

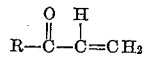

wherein R is an alkyl group such as methyl, ethyl, propyl, isopropyl, n-butyl, sec-butyl, amyl, hexyl, octyl, decyl and the like. Alkyl vinyl ketones wherein R is an alkyl radical containing from 1 to 5 carbon atoms are preferred as those from which the most useful copolymers may be prepared. Mixtures of two or more alkyl vinyl ketones may be employed.

The copolymerization of vinylidene cyanide with an alkyl vinyl ketone may be carried out in a number of different ways. For example, one preferred method, which gives fastest copolymerization reactions, consists in heating and agitating a mixture of the monomers, with or without a polymerization initiator such as a peroxygen compound as desired, to effect the copolymerization without the use of a solvent or other liquid medium for the monomers. The copolymerization occurs most readily at temperatures from about 20° C. to 100° C., the copolymer generally forming as a white resinous powder which is easily separated from the other constituents. The polymerization may be effected at temperatures as low as 0° C. or lower, or as high as 100° C. or higher, provided that if a free radical initiator is utilized it is one which will dissociate into free radicals at the polymerization temperature.

Another method of polymerization consists of dissolving the vinylidene cyanide and alkyl vinyl ketone in an aromatic hydrocarbon or chlorinated aromatic hydrocarbon solvent such as benzene, toluene, methyl toluene, trichlorobenzene and the like which is preferably free from impurities which initiate the ionic polymerization of the vinylidene cyanide monomer, and in an amount such that the solvent comprises approximately 30 to 80% by weight of the total solution. A free radical polymerization initiator is included in this solution and the resulting mixture is heated preferably to a temperature of about 20° C. to 80° C., whereupon copolymerization occurs to form the desired copolymer as a white resinous powder of small particle size. The copolymer thus formed may be recovered from the polymerization mixture by filtering or evaporation of the other constituents.

The relative amounts of vinylidene cyanide and alkyl vinyl ketone in any polymerization charge are not critical since a useful copolymer is obtained regardless of the amount of either comonomer in the charge. The amount of vinylidene cyanide in the monomer charge may be as low as 0.1 mol per cent or as high as 99 mol per cent while still obtaining copolymers markedly different in properties from homopolymers of either vinylidene cyanide or alkyl vinyl ketone.

Regardless of the polymerization method or monomer ratio utilized, the polymerization is preferably stopped before either of the monomers is entirely consumed in order that a true copolymer will be obtained. It is often desirable to add to the polymerization mixture during the course of the copolymerization reaction, continuously or intermittently, fresh quantities of one or both monomers and also of initiator and solvent if desired, thus taking full advantage of the combining ratio of the monomers and the capacity of the equipment, and in effect operating a continuous or semi-continuous process.

The initiator which may be employed in the polymerization process is preferably a peroxygen compound, such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, 2,4-dichlorobenzoyl peroxide, o,o'-dibromobenzoyl peroxide, caprylyl peroxide, pelargonyl peroxide, tertiary butyl hydroperoxide, tetralin peroxide and the like. In general, from 0.01% to 2.0% by weight of the initiator, based on the weight of the monomers is employed, although larger or smaller quantities may be used if desired.

The following examples illustrate the preparation of copolymers of vinylidene cyanide with alkyl vinyl ketones in accordance with this invention, but are not to be construed as a limitation upon the scope thereof, for there are of course, many possible variations and modifications.

Examples 1 through 3

A series of three copolymers of vinylidene cyanide with methyl vinyl ketone are prepared by mixing varying amounts of both monomers with benzene and 1% (based on the total weight of the monomers) of 2,4-dichlorobenzoyl peroxide in a reaction vessel, blanketing the mixture with nitrogen, sealing the reaction vessel and maintaining the resulting mixture at a temperature of about 40° C. for a period of time from 21 to 28 hours. The solid resinous copolymers obtained at the end of the reaction period are dried and analyzed to determine their composition. The amounts of reactants, reaction data and analysis of the copolymers are recorded in the following table. When commercial grade methyl vinyl ketone is employed it is dried over potassium carbonate and distilled before use.

| Example | 1 | 2 | 3 |
|---|---|---|---|
| Vinylidene cyanide in polymerization charge: | | | |
| mol percent | 8.2 | 26.5 | 50.0 |
| grams | 0.7 | 2.0 | 2.0 |
| Methyl vinyl ketone in polymerization charge: | | | |
| mol percent | 91.8 | 73.5 | 50.0 |
| grams | 7.0 | 5.0 | 1.8 |
| Benzene, ml | 25 | 25 | 25 |
| 2,4-dichlorobenzoyl peroxide in polymerization charge, 50% paste, grams | 0.16 | 0.14 | 0.076 |
| Reaction Time, hours | 21.3 | 22.3 | 28.5 |
| Polymer Yield, grams | 0.33 | 0.52 | 0.06 |
| Conversion, percent | 4.3 | 7.4 | 1.6 |
| Polymer nitrogen content, percent | 15.38 | 15.35 | 16.98 |
| Mol percent vinylidene cyanide in copolymer | 40.2 | 40.2 | 44.6 |

The resinous copolymers of Examples 1, 2 and 3 possess melting (softening) points of 135 to 140° C. When the copolymerization is carried out with other alkyl vinyl ketones present in addition to or in place of methyl vinyl ketone, either singly or a mixture of two or more alkyl vinyl ketones, excellent copolymers are obtained. Likewise when the polymerization is carried out utilizing other of the peroxygen initiators of the type disclosed hereinbefore, and in the presence of other aromatic solvents of the type disclosed hereinbefore, useful resinous materials are obtained containing copolymerized vinylidene cyanide and alkyl vinyl ketone.

When the preceding examples are repeated in the absence of benzene, that is, by simply mixing the two monomers together and heating, excellent resinous copolymers are obtained.

Example 4

A copolymer of vinylidene cyanide with methyl vinyl ketone is prepared by mixing 2.0 grams (50 mol per cent) of vinylidene cyanide with 1.8 (50 mol per cent) grams of methyl vinyl ketone and heating the mixture in a reaction vessel at 40° C. for 18 hours. About 90+ per cent of the monomer mixture is converted to a resinous copolymer.

When the copolymerization is carried out with other alkyl vinyl ketones present in addition to or in place of methyl vinyl ketones and in the presence of a peroxygen initiator if desired, excellent copolymers are obtained.

The copolymers prepared according to the method of the present invention are extremely useful resinous materials. For example, they may be utilized in the melt or solvent spinning of excellent filaments and in the preparation of films as well as for many other uses.

Although specific examples of the invention have been herein described, it is not intended to limit the invention solely thereto, but to include all of the variations and modifications falling within the spirit and scope of the appended claims.

We claim:

1. A copolymer of monomers consisting of vinylidene cyanide and alkyl vinyl ketone, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid water-insoluble resin.

2. The copolymer of claim 1 wherein the alkyl vinyl ketone has the general formula

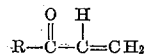

wherein R is an alkyl radical containing from 1 to 5 carbon atoms.

3. A two-component copolymer of vinylidene cyanide with methyl vinyl ketone, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid water-insoluble resin.

4. The method which comprises mixing together monomeric vinylidene cyanide, which is a liquid at room temperature and a crystalline solid at 0° C., having a melting point when in pure form of substantially 9.0° C. to 9.7° C. and is characterized chemically by the ability to undergo on contact with water at room temperature an instantaneous homopolymerization reaction to give a solid water-insoluble resin, and an alkyl vinyl ketone whereupon polymerization occurs to form a copolymer of vinylidene cyanide and alkyl vinyl ketone.

5. The method of claim 4 wherein alkyl vinyl ketone has the general formula

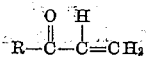

wherein R is an alkyl radical containing from 1 to 5 carbon atoms.

6. The method of claim 4 wherein the reaction is conducted at a temperature of from 20 to 100° C.

7. The method which comprises mixing together monomeric vinylidene cyanide, which is a liquid at room temperature and a crystalline solid at 0° C., having a melting point when in pure form of substantially 9.0° C. to 9.7° C. and is characterized chemically by the ability to undergo on contact with water at room temperature an instantaneous homopolymerization reaction to give a solid water-insoluble resin, and an alkyl vinyl ketone in the presence of an aromatic solvent and a peroxygen initiator, whereupon polymerization occurs to form a copolymer of vinylidene cyanide and alkyl vinyl ketone.

HARRY GILBERT.
FLOYD F. MILLER.

References Cited in the file of this patent

UNITED STATES PATENTS

| Number | Name | Date |
|---|---|---|
| 2,466,395 | Dickey | Apr. 5, 1949 |